United States Patent
Gilling et al.

(10) Patent No.: US 9,358,983 B2
(45) Date of Patent: Jun. 7, 2016

(54) METHOD AND SYSTEM FOR DETERMINING A WADING DEPTH OF A VEHICLE

(71) Applicant: Jaguar Land Rover Limited, Whitley, Coventry Warwickshire (GB)

(72) Inventors: Simon Gilling, Kenilworth (GB); Thuy-Yung Tran, Rugby (GB); Edward Hoare, Malvern (GB); Nigel J. Clarke, Bridgnorth (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/379,002

(22) PCT Filed: Feb. 14, 2013

(86) PCT No.: PCT/EP2013/053022
§ 371 (c)(1),
(2) Date: Aug. 15, 2014

(87) PCT Pub. No.: WO2013/120970
PCT Pub. Date: Aug. 22, 2013

(65) Prior Publication Data
US 2014/0371976 A1  Dec. 18, 2014

(30) Foreign Application Priority Data
Feb. 15, 2012 (GB) .................................. 1202617.5

(51) Int. Cl.
*G06F 19/00* (2011.01)
*B60W 40/076* (2012.01)
*G01F 23/00* (2006.01)

(52) U.S. Cl.
CPC ......... *B60W 40/076* (2013.01); *G01F 23/0061* (2013.01); *G01F 23/0076* (2013.01)

(58) Field of Classification Search
CPC .............. B60W 40/06; G01F 23/0076; G01F 23/2962; B60G 17/0165; G60G 1/019
USPC ................ 701/22, 37, 70, 112, 116; 340/438, 340/425.5, 442
See application file for complete search history.

(56) References Cited

U.S. PATENT DOCUMENTS 5,822,047 A * 10/1998 Contarino et al. ........... 356/5.01
9,026,310 B2 * 5/2015 Tran et al. ...................... 701/37
(Continued)

FOREIGN PATENT DOCUMENTS

DE 102004028157 B3  1/2006
GB 2 356 602     *  5/2001 ............. B60K 31/00
(Continued)

OTHER PUBLICATIONS

International Search Report for application No. PCT/EP2013/053022, dated Apr. 3, 2013, 6 pages.
(Continued)

*Primary Examiner* — McDieunel Marc
(74) *Attorney, Agent, or Firm* — Reising Ethington P.C.

(57) ABSTRACT

A method of determining a wade depth ($d_{Max}$) in relation to a vehicle (1) when at least partially submerged in water. An attitude of the vehicle (1) is determined and a first height ($d_{Sensed}$) of the surface of the water measured relative to a first reference point on the vehicle (1). The wade depth ($d_{Max}$) is determined based on the attitude of the vehicle (1) and said first height ($d_{Sensed}$). Alternatively, or in addition, the travel height ($H_S$) of a vehicle suspension is determined. Aspects of the invention also relates to a system and a vehicle (1).

20 Claims, 5 Drawing Sheets

(56) References Cited

U.S. PATENT DOCUMENTS

| | | | |
|---|---|---|---|
| 2009/0159020 A1 | 6/2009 | Hall et al. | |
| 2013/0307679 A1* | 11/2013 | Tran et al. | 340/442 |
| 2014/0085066 A1* | 3/2014 | Tran et al. | 340/425.5 |
| 2014/0156126 A1* | 6/2014 | Tran et al. | 701/22 |
| 2014/0184247 A1* | 7/2014 | Tran et al. | 324/663 |
| 2014/0288793 A1* | 9/2014 | Tran et al. | 701/70 |
| 2014/0293056 A1* | 10/2014 | Popham et al. | 348/148 |
| 2014/0293746 A1* | 10/2014 | Tran | G01F 23/00 367/93 |
| 2014/0347178 A1* | 11/2014 | Tran et al. | 340/438 |
| 2015/0033846 A1* | 2/2015 | Tran et al. | 73/304 |
| 2015/0046032 A1* | 2/2015 | Clarke et al. | 701/37 |
| 2015/0046071 A1* | 2/2015 | Clarke et al. | 701/112 |
| 2015/0066339 A1* | 3/2015 | Hoare et al. | 701/116 |

FOREIGN PATENT DOCUMENTS

| | | | |
|---|---|---|---|
| GB | 2356602 | S | 5/2001 |
| GB | 2376929 | A | 12/2002 |
| GB | 2486452 | A | 6/2012 |
| KR | 20110109614 | A | 10/2011 |
| KR | 20110109618 | A | 10/2011 |

OTHER PUBLICATIONS

Great Britain Combined Search and Examination Report for application No. GB1202617.5, dated Jun. 12, 2012.

Great Britain Search Report corresponding to application No. GB1202617.5, dated Nov. 27, 2012.

* cited by examiner

METHOD AND SYSTEM FOR DETERMINING A WADING DEPTH OF A VEHICLE

TECHNICAL FIELD

The present invention relates to a method and system for determining a wading depth in relation to a vehicle when at least partially submerged in water. Aspects of the invention relate to a system, to a vehicle, to a method and to a computer program.

BACKGROUND OF THE INVENTION

It is common for off-road vehicles to drive through a body of water and this is referred to herein as a wading event. However, the wade depth (i.e. the level of the water in relation to the vehicle) should not exceed certain thresholds. Known techniques for detecting water include the use of resistive or capacitive water sensors. However, it may prove difficult to safely package water sensors around the vehicle, especially at a height low enough to provide a timely indication of a wading event without compromising the ground clearance of the vehicle.

The Applicant has filed a series of applications relating to vehicle wading events, including: GB1021268.6 filed on 25 Feb. 2010; GB1121625.6 filed on 15 Dec. 2011; GB1121621.5 filed on 15 Dec. 2011, GB1021278.5 filed on 25 Feb. 2010; GB1121624.9 filed on 15 Dec. 2011, GB1021272.8 filed on 25 Feb. 2010, GB1121622.3 filed on 15 Dec. 2011; GB1021297.5 filed on 25 Feb. 2010, GB1121626.4 filed on 15 Dec. 2011; GB1121629.8 filed on 15 Dec. 2011; GB1021295.9 filed on 15 Dec. 2010; GB1121623.1 filed on 15 Dec. 2011; GB1021296.7 filed on 15 Dec. 2010; GB1121620.7 filed on 15 Dec. 2011; GB1121619.9 filed on 15 Dec. 2011; GB1121618.1 filed on 15 Dec. 2011; GB1104367.6 filed on 15 Mar. 2011; and GB1114124.9 filed on 17 Aug. 2011.

The content of these applications is expressly incorporated herein in their entirety by reference.

It is against this background that the present invention has been conceived. Embodiments of the invention may provide a method, a system, a monitor, or a vehicle which improves over the prior art arrangements. Other aims and advantages of the invention will become apparent from the following description, claims and drawings.

SUMMARY OF THE INVENTION

Aspects of the invention provide a method, a system, or a vehicle as claimed in the appended claims.

According to another aspect of the invention for which protection is sought, there is provided a method of determining a wade depth in relation to a vehicle when at least partially submerged in water; the method comprising:
   (a) determining an attitude of the vehicle;
   (b) measuring a first height of the surface of the water relative to a first reference point on the vehicle; and
   (c) determining said wade depth based on the attitude of the vehicle and said first height.

By determining the attitude of the vehicle relative to at least one horizontal reference axis, the wade depth relative to the vehicle can be estimated. More particularly, the maximum wade depth (i.e. the highest water level relative to the vehicle, based on physical characteristics of the vehicle such as the height of an air inlet for an engine or the overall vehicle mass and footprint area) can be determined. The wade depth can be used to provide a notification for a driver when a threshold wade depth is reached or exceeded.

The method can comprise determining a travel position of a vehicle suspension. The travel position can be measured, for example, by a displacement sensor. Alternatively, or in addition, the travel position can be determined with reference to a vehicle suspension setting. For example, the suspension can be adjustable for different operating modes and the travel position can be determined based on the selected operating mode.

The use of the travel position of the suspension to determine a wade depth is believed to be independently patentable. Accordingly, in a further aspect, the present invention relates to a method of determining a wade depth in relation to a vehicle when at least partially submerged in water; the method comprising:
   (a) determining a travel position of a vehicle suspension;
   (b) measuring a first height of the surface of the water relative to a first reference point on the vehicle; and
   (c) determining the wade depth in relation to the vehicle based on said travel position and said first height.

By combining the travel position and the measured first height, the wade depth can be determined with increased accuracy. The method of determining the wade depth utilising the travel position of the suspension can comprise determining an attitude of the vehicle.

The attitude of the vehicle can refer to vehicle roll (i.e. rotation about a longitudinal axis of the vehicle) and/or vehicle pitch (i.e. rotation about a transverse axis). The attitude of the vehicle is typically measured as an angle relative to a horizontal axis or plane.

A first reference height can be defined for said first reference point. Alternatively, or in addition, the first reference height can be measured when the vehicle is not in a wading event, for example as part of a calibration sequence. The depth of water can be calculated by subtracting the measured first height from the first reference height. The travel position of the vehicle suspension can optionally also be added or subtracted, as appropriate. The wade depth can be determined based on said depth of water and optionally also the attitude of the vehicle.

The methods described herein can include determining a first vertical offset at a first position and adding said vertical offset to the measured height of the water at said first reference point. The first vertical offset could be calculated, for example using trigonometry. Alternatively, the first vertical offset could be looked up in a reference table. The first position can be displaced longitudinally and/or laterally from said first reference point. The first position can represent an extremity of the vehicle, such as a front or back of the vehicle or a lateral corner of the vehicle. The first vertical offset is thereby indicative of a maximum vertical offset. The method can comprise determining more than one vertical offset, for example to determine the vertical offset at the front and back of the vehicle.

The step of determining the wade depth can include applying a bow wave compensating factor. The bow wave compensating factor can make an allowance for the profile of a bow wave formed as the vehicle travels through water. The bow wave can reduce the water level behind the front wheels of the vehicle and an erroneously low wade depth may be determined if the height of the water is measured in this area. The bow wave compensating factor can be determined by experimental analysis or computer modelling. Moreover the bow wave compensating factor can be customised based on one or more of the following operating parameters: vehicle forward speed; vehicle acceleration; vehicle attitude (pitch and/or roll); suspension travel; vehicle turning angle; depth of water; speed and/or direction of water; and said measured first height.

The first height can be measured by detecting a signal reflected off of a surface of the water. For example, the signal can be ultrasonic or a laser. The first height can be determined by measuring the time-of-flight of the signal from transmittal to reception.

The detected signal can be amplified to account for signal attenuation. Signal attenuation may occur, for example, due to the attitude of the vehicle relative to the surface of the water. The amplification applied to the detected signal could be based on the vehicle attitude.

The method can comprise measuring a second height relative to a second reference point on the vehicle. The method can include comparing said first and second heights to determine an attitude of the vehicle. If the first and second reference points are offset laterally, the comparison of said first and second heights could determine a lateral gradient. The first reference point can be provided on a first side of the vehicle and the second reference point can be provided on a second side of the vehicle. If the first and second reference points are offset longitudinally, a longitudinal gradient could be determined. Of course, the method could include measuring the height at more than two reference points.

A dedicated attitude sensor could be provided for measuring the attitude of the vehicle. The attitude sensor could, for example, comprise a gyroscope and/or an accelerometer. The attitude sensor could detect the attitude of the vehicle about one or more axis. A single axis attitude sensor could, for example, measure the attitude of the vehicle about a longitudinal axis or a transverse axis of the vehicle. A dual axis attitude sensor could measure the attitude of the vehicle about both said longitudinal axis and said transverse axis. The attitude sensor typically measures the angular orientation of the vehicle relative to a horizontal plane.

The attitude sensor can comprise a longitudinal accelerometer. The method can comprise modifying the measured longitudinal acceleration by subtracting the dynamic vehicle (wheel speed) acceleration to produce the acceleration due to gravity and hence the longitudinal gradient. The method can comprise applying a filter to the signal from the attitude sensor to take account of acceleration variations, for example resulting from braking and/or acceleration of the vehicle. The magnitude and rate of change of both brake pressure and throttle input can be monitored to provide improved filtering. The method can output a calculated longitudinal gradient and support calculation of the maximum depth at the deepest point on the vehicle using said at least said first sensor.

In a still further aspect, the present invention relates to a system for determining a wade depth in relation to a vehicle when at least partially submerged in water; the system comprising:
an attitude sensor for measuring the angular orientation of the vehicle relative to a horizontal axis;
at least a first sensor for measuring a first height of the surface of the water relative to a first reference point on the vehicle; and
a processor for determining the wade depth in relation to the vehicle based on said measured angular orientation and said first height.

The system can comprise means for determining a travel position of a vehicle suspension. The attitude sensor can be configured to measure the pitch (i.e. angular rotation about a lateral axis of the vehicle) and/or roll (i.e. angular rotation about a longitudinal axis of the vehicle).

In a yet further aspect, the present invention relates to a system for determining a wade depth in relation to a vehicle when at least partially submerged in water; the system comprising:
means for determining a travel position of a vehicle suspension;
at least a first sensor for measuring a first height of the surface of the water relative to a first reference point on the vehicle; and
a processor for determining the wade depth in relation to the vehicle based on said travel position and said first height.

The system can comprise an attitude sensor for measuring the orientation of the vehicle relative to a horizontal axis. The attitude sensor can be configured to measure the pitch (i.e. angular rotation about a lateral axis of the vehicle) and/or roll (i.e. angular rotation about a longitudinal axis of the vehicle).

The means for determining a travel position of a vehicle suspension could comprise a displacement sensor or a reference table to identify the travel position based on an operating mode of the vehicle.

The system of the present invention may be configured to provide means for indicating to the driver, the vehicle attitude and/or wading depth as determined by the system.

The first sensor can be provided in a first wing mirror assembly of the vehicle. The wing mirror assembly is typically mounted to the exterior of the vehicle in sight of the driver. A second sensor could be provided for measuring a second height of the surface of the water relative to a second reference point on the vehicle. The second sensor can be provided in a second wing mirror assembly of the vehicle. At least said first sensor could comprise a transceiver for transmitting a signal and detecting a reflected signal off the surface of the water. At least said first sensor could be ultrasonic or laser.

In a further aspect, the invention relates to a vehicle comprising a system as described herein.

The method(s) described herein can be machine-implemented. The method described herein can be implemented on a computational device comprising one or more processors, such as an electronic microprocessor. The processor(s) can be configured to perform computational instructions stored in memory or in a storage device. The device described herein can comprise one or more processors configured to perform computational instructions.

In a further aspect the present invention relates to a computer system comprising: programmable circuitry; and software encoded on at least one computer-readable medium to program the programmable circuitry to implement the method described herein.

According to a still further aspect the present invention relates to one or more computer-readable media having computer-readable instructions thereon which, when executed by a computer, cause the computer to perform all the steps of the method(s) described herein.

The references herein to the vehicle attitude refer to the orientation of the vehicle relative to a horizontal reference plane. The vehicle attitude can be defined as the angular orientation of the longitudinal axis and/or the transverse axis of the vehicle relative to a horizontal reference axis or a vertical reference axis. The reference axes are illustrated in the accompanying Figures as dashed lines.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments, unless such features are incompatible.

BRIEF DESCRIPTION OF THE DRAWINGS

An embodiment of the present invention will now be described, by way of example only, with reference to the accompanying figures, in which.

DETAILED DESCRIPTION OF AN EMBODIMENT

Figure 1:
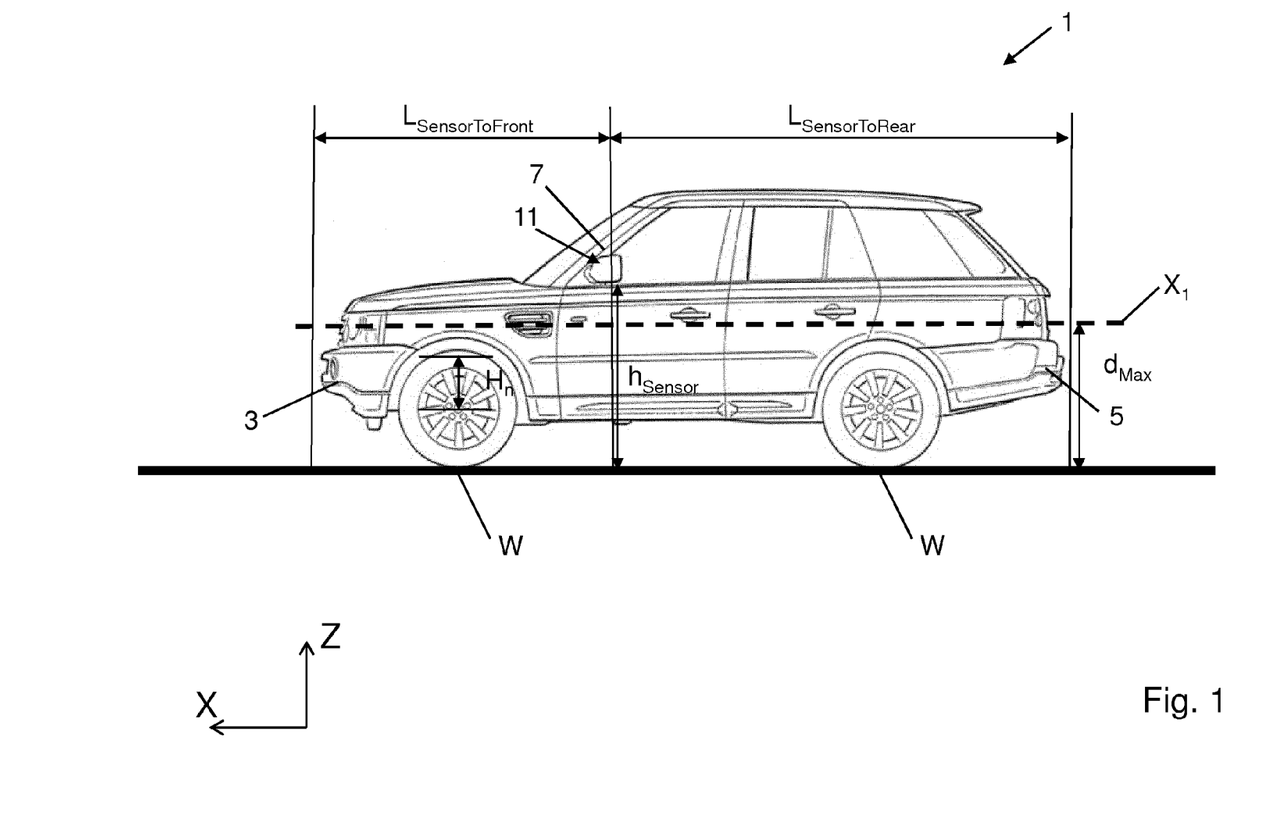
FIG. 1 shows a vehicle overlaid with dimensions used to determine a maximum wade depth in accordance with an embodiment of the present invention.

A vehicle 1 capable of wading through water is shown in FIG. 1. In accordance with an embodiment of the present invention, the vehicle 1 is provided with a wading monitor (not shown) configured to estimate a maximum wade depth $d_{Max}$ representative of the water level in relation to the vehicle 1. The wading monitor can output wading information for the driver and optionally, via a display or audible warning (not shown), provide an alert if the calculated maximum wade depth $d_{Max}$ approaches a threshold value.

The vehicle 1 comprises four wheels W mounted on a chassis by an independent air suspension (not shown). The suspension is adjustable to alter the ride height of the vehicle 1 for various driving scenarios. Specifically, the air suspension can provide pre-defined ride heights for one or more of the following operating modes: Access; Motorway; Standard; Intermediate Off-Road; and Off-Road. The air suspension can also provide an Extended mode which provides a timed inflation to increase the ride height, so is dependent on the current load and the previous wheel position. The suspension dynamically measures the suspension height $H_n$ and communicates this as one of a set of predetermined values. A change in the suspension height can be output as a suspension height modifier $H_{n'}$.

Figure 5:
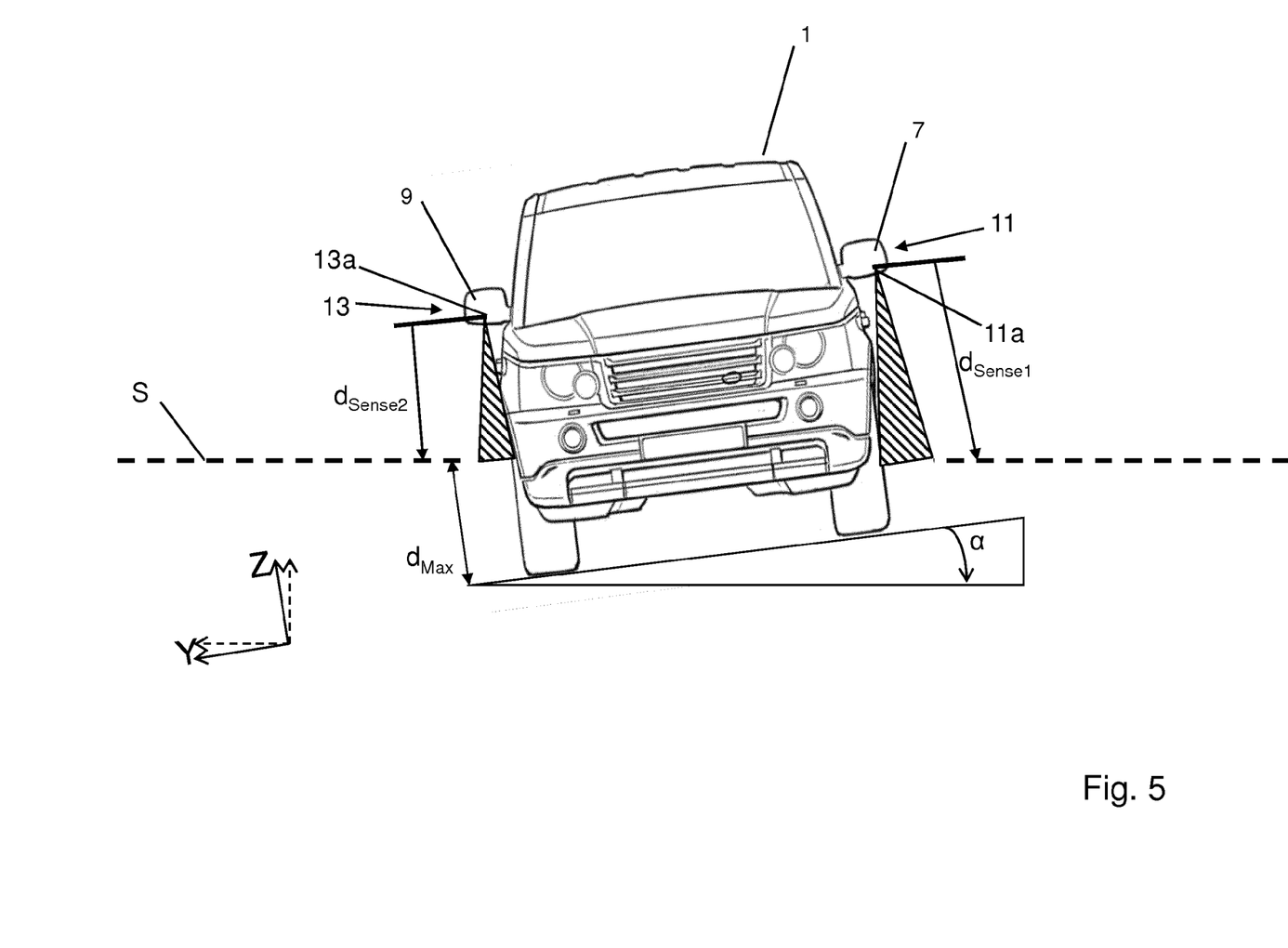
FIG. 5 shows the vehicle of FIG. 1 in a lateral gradient wading event.

As illustrated in, for example, FIGS. 1 and 5, the vehicle 1 comprises a front bumper 3, a rear bumper 5, a left wing mirror assembly 7 and a right wing mirror assembly 9. A first wading sensor 11 is housed in the left wing mirror assembly 7; and a second wading sensor 13 is housed in the right wing mirror assembly 9. The first and second wading sensors 11, 13 define first and second reference points which are used by the wading monitor in conjunction with the vehicle dimensions to determine the wade depth $d_{Max}$. The vehicle dimensions are summarized with reference to FIG. 1 as follows:

$h_{Sensor}$ The height of the wade sensor 11, 13 above ground height, which is dependent on the selected operating mode of the air suspension.
(Present embodiment: Off-Road=1.23 m; Standard=1.19 m; Access=1.14 m)

$L_{SensorToFront}$ The distance from the front of the vehicle to the wade sensors 11, 13.
(Present embodiment: 1.8 m)

$L_{SensorToRear}$ The distance from the rear of the vehicle to the wade sensor.
(Present embodiment: 2.9 m)

The maximum wade depth $d_{Max}$ lies parallel to a longitudinal axis X of the vehicle 1 and is illustrated by a dashed line $X_1$. In the example, the operational wading threshold (not shown) is specified as 0.7 m for the vehicle 1 when the air suspension is set to the off-road operating mode.

The first and second wading sensors 11, 13 shown, for example, in FIG. 5 each comprise an ultrasonic transceiver 11a, 13a which may be combined with a puddle light or indicator assembly (turn signal) (not shown). The first and second wading sensors 11, 13 are directed downwardly substantially parallel to a vertical axis Z of the vehicle 1. In use, the ultrasonic transceivers 11a, 13a transmit an ultrasonic signal (illustrated by a shaded triangle in the figures) which is reflected off of a surface S of a body of water. It will be appreciated that in normal driving, where the vehicle is travelling on dry roads, the ultrasonic signal will be reflected back from the road surface. In this case, as the ride height is known, the system may be arranged to periodically perform a self-diagnostic and/or calibration cycle, using dry land as a known reference point. In the case where the vehicle is driving through a body of water, the reflected signal is detected by the associated transceiver 11a, 13a and the time-of-flight of the ultrasonic signal is used to determine the distance $d_{Sensed}$ between the wading sensor 11, 13 and the surface S of the body of water.

The measured distance $d_{Sensed}$ may fluctuate due to the movement of the surface S of the water, for example due to ripples/waves/splashes in the water. An electronic filter may be applied to remove noise from the detected signal. Furthermore, the reflected signal may be attenuated if the vehicle 1 is inclined relative to the surface S of the water (since it is not reflected directly towards the ultrasonic transceiver 11a, 13a) and the wading monitor can amplify the detected signal and/or apply corrections.

Measuring the distance $d_{Sensed}$ between the wading sensors 11, 13 and the surface S of the body of water allows the localised water depth $d_{Measured}$ (i.e. the water depth proximal the wading sensors 11, 13) to be calculated using the following equation:

$$\text{Measured Water Depth } (d_{Measured}) = \\ \text{Sensor mounting height } (h_{Sensor}) - \text{Measured distance} \\ \text{to water } (d_{Sensed}) \pm \text{Suspension height modifier } (H_{n'})$$

The wading monitor adjusts the water depth $d_{Measured}$ by adding or subtracting a vehicle suspension height modifier ($H_n$) to compensate for changes in the suspension height for the selected suspension operating mode. The wading monitor can also apply a bow wave modifier (±ve) which allows for variations resulting from the formation of a bow wave which can reduce the depth of the water behind the front wheels as the vehicle 1 moves through the water. The bow wave modifier can be calibrated with respect to vehicle speed and/or water depth.

The maximum wade depth $d_{Max}$ for the vehicle 1 is thereby based on the vehicle and suspension height information which can be transmitted over the vehicle closed area network (CAN) bus by the general proximity sensing module (GPSM). The calculated maximum wade depth $d_{Max}$ is then transmitted over the CAN bus by the GPSM for reference by other vehicle systems.

Figure 2:
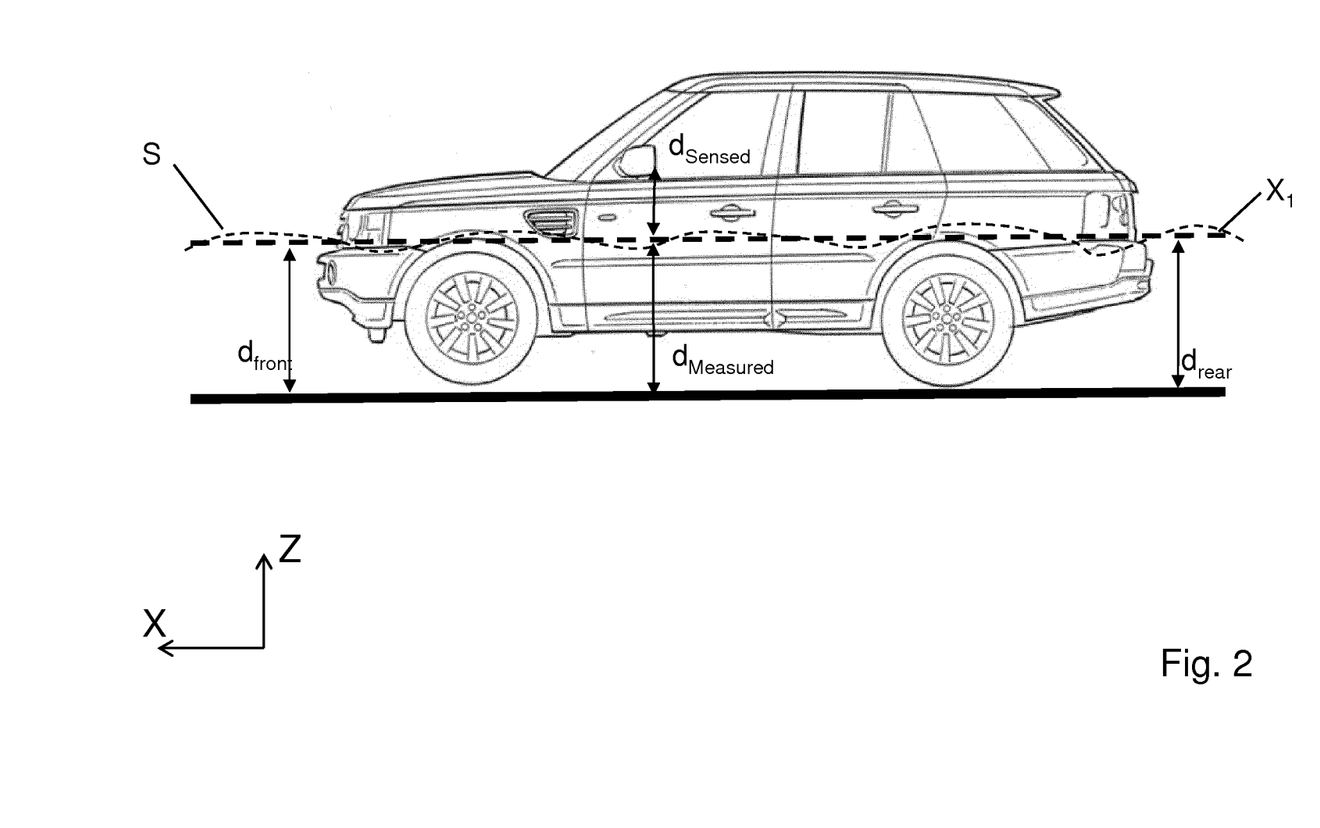
FIG. 2 shows the vehicle of FIG. 1 in a level wading event.

In the example arrangement illustrated in FIG. 2, the vehicle 1 is substantially level (i.e. the longitudinal axis X of the vehicle 1 is substantially horizontal) and is driving through a body of water in a wading event. With the vehicle 1 level, the maximum wade depth $d_{Max}$ is equal to the measured depth $d_{Measured}$ and is substantially uniform along the length of the vehicle. It will be understood that the water depth at the front of the vehicle $d_{front}$ is substantially equal to the water depth at the rear of the vehicle $d_{rear}$. This can be summarised by the following statement:

Max Wade Depth ($d_{Max}$) = Measured Water Depth ($d_{Measured}$) =

Front Depth ($d_{front}$) = Rear Depth ($d_{near}$)

It will be appreciated that the vehicle 1 will not always be level. To determine the attitude of the vehicle 1 relative to the surface of the water S, the wading monitor further comprises an attitude sensor (not shown) for measuring the longitudinal pitch of the vehicle 1. The attitude sensor measures a longitudinal gradient angle θ relative to a longitudinal axis X of the vehicle 1. The attitude sensor thereby provides an indication of the longitudinal pitch of the vehicle 1 (i.e. the angular orientation about a transverse axis Y of the vehicle 1). The attitude sensor comprises a vehicle longitudinal accelerometer which subtracts the wheel speed acceleration to produce the acceleration due to gravity and hence the longitudinal gradient. The wading monitor can apply a filter to the signal from attitude sensor to take account of acceleration perturbations resulting from braking and/or acceleration of the vehicle. The magnitude and rate of change of both brake pressure and throttle input are monitored to provide improved filtering for calculating the longitudinal gradient. The attitude sensor could alternatively or additionally be a gyroscope.

Figure 3:
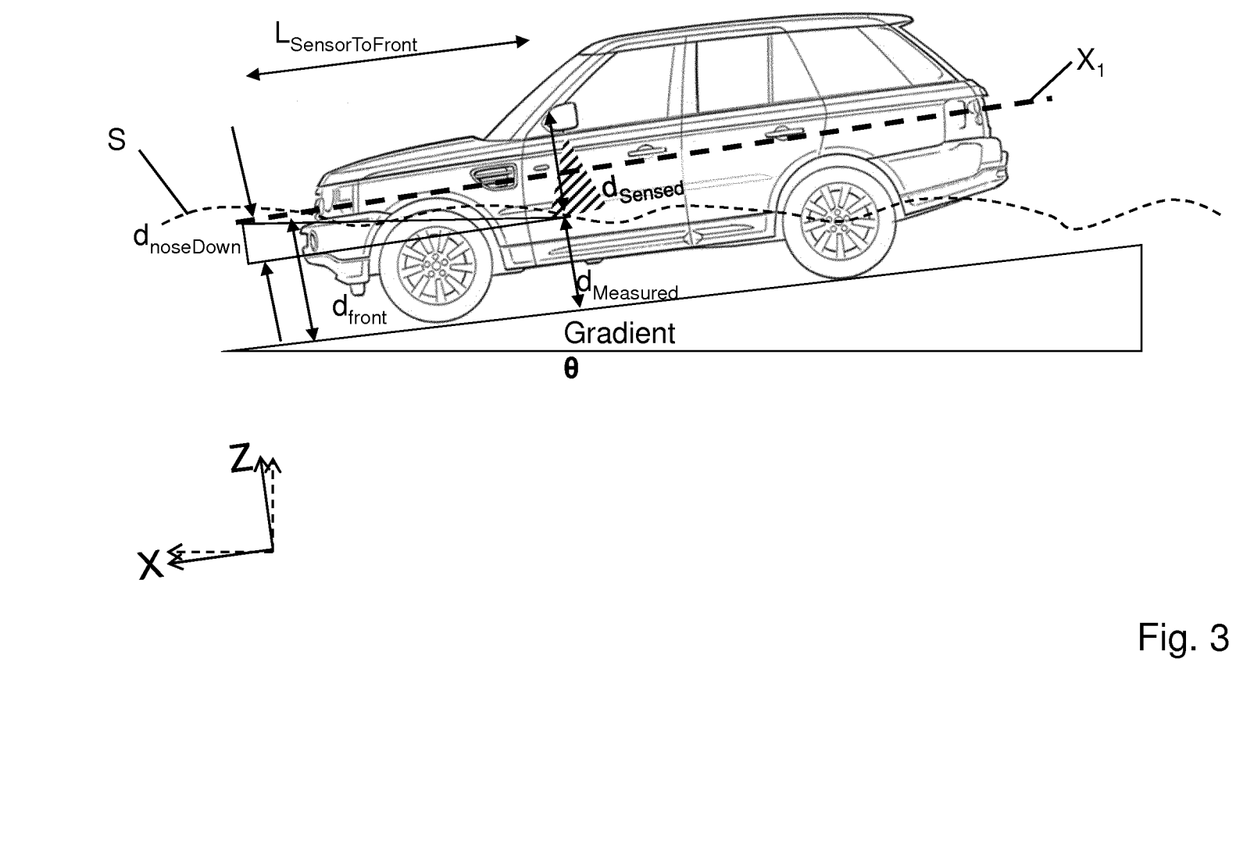
FIG. 3 shows the vehicle of FIG. 1 in a nose-down wading event.

The vehicle 1 is illustrated in FIG. 3 in a nose-down wading event, whereby the front of the vehicle is lower than the rear of the vehicle. Specifically, the vehicle 1 is shown in a nose-down attitude at a longitudinal gradient angle θ. As in the first exemplary arrangement, the first and second wading sensors 11, 13 determine the sensed distance $d_{Sensed}$ between the wading sensor 11, 13 and the surface S of the body of water. The wading monitor then calculates the measured water depth $d_{Measured}$ by subtracting the sensed distance $d_{Sensed}$ from the sensor height $h_{Sensed}$.

As the vehicle 1 is in a nose-down attitude, the depth of water at the front of the vehicle $d_{front}$ is greater than the depth of water at the rear of the vehicle $d_{rear}$. The attitude sensor measures the inclination angle θ of the vehicle 1 and the wading sensor uses this data to calculate the increased depth of water at the front of the vehicle 1. Specifically, the nose-down depth $d_{NoseDown}$ at the front of the vehicle is calculated as follows:

$$d_{NoseDown} = \tan \theta \; L_{SensorToFront}$$

By way of example, if the longitudinal gradient angle θ is 6°, then Tan 6*180 cm ($L_{SensorToFront}$)=18.9 cm. The nose-down depth $d_{NoseDown}$ is added to the measured water depth $d_{Measured}$ to provide a maximum front wade depth $d_{front}$ which is set as the wade depth $d_{Max}$.

Figure 4:
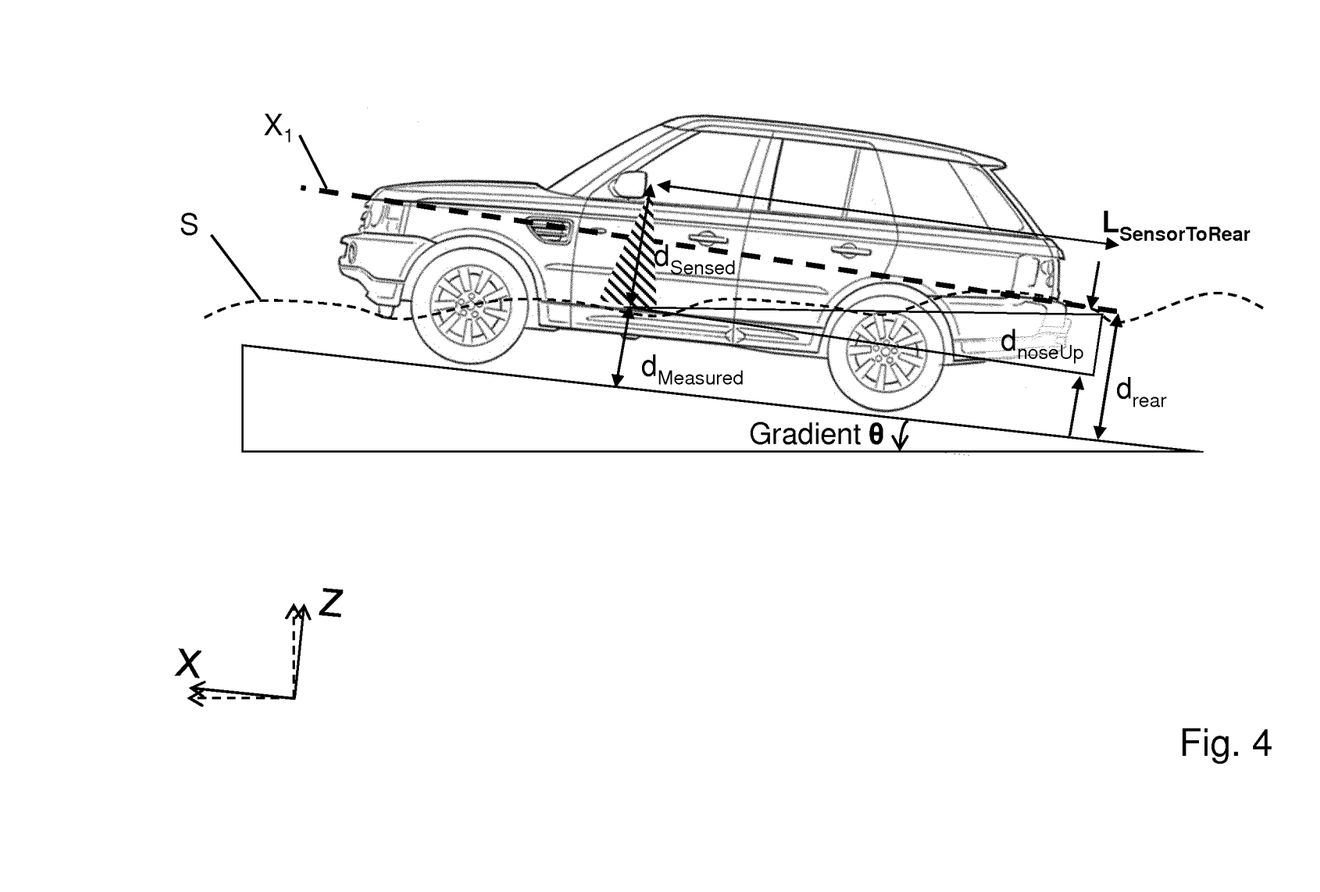
FIG. 4 shows the vehicle of FIG. 1 in a nose-up wading event.

The vehicle 1 is shown in a nose-up wading event in FIG. 4. In this arrangement, the front of the vehicle 1 is higher than the rear of the vehicle. The vehicle 1 is shown in a nose-up attitude at a longitudinal gradient angle θ. Again, the first and second wading sensors 11, 13 determine the distance $d_{Sensed}$ between the wading sensor 11, 13 and the surface S of the body of water.

As the vehicle 1 is in a nose-up attitude, the depth of water at the rear of the vehicle $d_{rear}$ is greater than the depth of water at the front of the vehicle $d_{front}$. The attitude sensor measures the inclination angle θ of the vehicle 1 and the wading sensor uses this data to calculate the increased depth of water at the rear of the vehicle 1. The wading sensor calculates the increased depth of water at the rear of the vehicle 1. Specifically, the nose-up depth $d_{NoseUp}$ at the front of the vehicle is calculated as follows:

$$d_{NoseUp} = \tan \theta * L_{SensorToRear}$$

By way of example, if the longitudinal gradient angle θ is 6°, then Tan 6*290 cm ($L_{SensorToRear}$)=30.5 cm. The nose-up depth $d_{NoseUp}$ is added to the measured water depth $d_{Measured}$ to provide a maximum rear wade depth $d_{Rear}$ which is set as the wade depth $d_{Max}$.

To determine the maximum wading depth $d_{Max}$ the wading monitor can calculate the maximum front wade depth $d_{Front}$ or the maximum rear wade depth $d_{Rear}$ based on whether the longitudinal gradient angle θ is positive or negative. Alternatively, the wading monitor can compare the maximum front wade depth $d_{Front}$ and the maximum rear wade depth $d_{Rear}$ and set the maximum wading depth $d_{Max}$ as the larger value.

A further arrangement is illustrated in FIG. 5 whereby the vehicle 1 is inclined on a lateral gradient angle α. The wading monitor can compare the differences in the sensed depths $d_{Sense1}$ and $d_{Sense2}$ to determine which side of the vehicle 1 is lower. The wading monitor can then use the sensed depth $d_{Sense}$ on that side of the vehicle to determine the maximum wading depth $d_{Max}$. A dedicated attitude sensor could be provided to measure the lateral angle α of the vehicle 1 and the maximum wading depth $d_{Max}$ calculated in three dimensions. For example, a longitudinal accelerometer and/or a gyroscope configured to measure the rate of change of roll rate may be used to provide the system with appropriate vehicle attitude data which may additionally be displayed to the driver, enabling the driver to complete a manoeuvre safely whilst being informed as to external factors which may affect vehicle behaviour.

The wading monitor can be used to output the maximum wading depth $d_{Max}$ during a wading event. An alert may be provided if the maximum wading depth $d_{Max}$ approaches or exceeds a threshold wading depth to allow the driver to take appropriate action.

The wading monitor can be used in conjunction with other wading sensors such as a moisture sensor to determine when the vehicle 1 is in a wading event. Additionally or alternatively, the wading monitor may be arranged to allow the driver to manually invoke the system to measure the water depth even in situations where the water depth is initially too shallow to be considered a wading event.

Furthermore, the wading monitor can also utilise dynamic operating parameters of the vehicle to assess a wading event. For example, the wading monitor can use the direction of travel of the vehicle (forwards, reverse and turning to either the left or right) to predict whether the maximum wading depth $d_{Max}$ of the vehicle 1 is likely to increase or decrease. If the vehicle 1 is in a nose-down attitude, the wading monitor can determine that the maximum wading depth $d_{Max}$ is likely to increase if the vehicle is driving forwards, and decrease if the vehicle is driving backwards. If the vehicle 1 is in a nose-up attitude, the wading monitor can determine that the maximum wading depth $d_{Max}$ is likely to decrease if the vehicle is driving forwards, and increase if the vehicle is driving backwards. Likewise, if the vehicle 1 is on a gradient (a longitudinal gradient or a lateral gradient), the wading monitor can determine that the maximum wading depth $d_{Max}$ is likely to increase or decrease depending on whether the vehicle is turning to ascend or descend the gradient. If the wading monitor determines that the maximum wading depth $d_{Max}$ is likely to increase and/or exceed a threshold, an alert could be provided to the driver.

It will be appreciated that various changes and modifications can be made to the wading monitor described herein without departing from the spirit and scope of the present invention. For example, the attitude sensor has been described as a single axis sensor to measure a longitudinal gradient θ of the vehicle 1. The attitude sensor could measure attitude in more than one axis, for example also to determine the lateral gradient angle α.

The invention claimed is:

1. A method of determining a wading depth of a vehicle when at least partially submerged in water, the method comprising carrying out the following steps using at least one processor at the vehicle:
   (a) determining an attitude of the vehicle using data from a first sensor on the vehicle;
   (b) measuring a first height of a water surface relative to a first reference point on the vehicle using data from a second sensor on the vehicle; and
   (c) determining said wade depth based on the attitude of the vehicle and said first height.

2. A method as claimed in claim 1 comprising determining a travel position of a vehicle suspension.

3. A method as claimed in claim 1, wherein determining the wade depth comprises calculating a first vertical offset at a first position displaced longitudinally and/or laterally from said first reference point and adding said vertical offset to the measured height of the water at said first reference point.

4. A method as claimed in claim 3, wherein said first position is located at a front of the vehicle or at a rear of the vehicle.

5. A method as claimed in claim 1, wherein determining the wade depth comprises applying a bow wave compensating factor based on a forward speed and/or acceleration of the vehicle.

6. A method as claimed in claim 1, wherein the first height is measured by detecting a signal reflected off the surface of the water.

7. A method as claimed in claim 6, wherein the detected signal is amplified or corrected to account for signal attenuation.

8. A method as claimed in claim 1, the method comprising measuring a second height relative to a second reference point on the vehicle.

9. A method as claimed in claim 8 comprising comparing said first and second heights to determine an attitude of the vehicle.

10. A method as claimed in claim 9, wherein the first reference point is provided on a first side of the vehicle and the second reference point is provided on a second side of the vehicle.

11. A system for determining a wading depth of a vehicle when at least partially submerged in water, the system comprising:
   an attitude sensor for measuring the angular orientation of the vehicle relative to a horizontal axis;
   at least a first sensor for measuring a first height of a water surface relative to a first reference point on the vehicle; and
   a processor for determining the wade depth of the vehicle based on said measured angular orientation and said first height.

12. A system as claimed in claim 11, wherein at least said first sensor is provided in a wing mirror assembly of the vehicle.

13. A vehicle comprising a system as claimed in claim 11.

14. A system for determining a wading depth of a vehicle when at least partially submerged in water, the system comprising:
   means for determining a travel position of a vehicle suspension assembly;
   at least a first sensor for measuring a first height of a water surface relative to a first reference point on the vehicle; and
   a processor for determining the wade depth of the vehicle based on said travel position and said first height.

15. A system as claimed in claim 14, wherein at least said first sensor is provided in a wing mirror assembly of the vehicle.

16. A vehicle comprising a system as claimed in claim 14.

17. A method of determining a wading depth of a vehicle when at least partially submerged in water; the method comprising carrying out the following steps using at least one processor at the vehicle:
   (a) determining a travel position of a vehicle suspension using data from a first sensor on the vehicle;
   (b) measuring a first height of a water surface relative to a first reference point on the vehicle using data from a second sensor on the vehicle; and
   (c) determining the wade depth of the vehicle based on said travel position and said first height.

18. A method as claimed in claim 17 comprising determining an attitude of the vehicle.

19. A method as claimed in claim 17, wherein determining the wade depth comprises calculating a first vertical offset at a first position displaced longitudinally and/or laterally from said first reference point and adding said vertical offset to the measured height of the water at said first reference point.

20. A method as claimed in claim 19, wherein said first position is located at a front of the vehicle or at a rear of the vehicle.

* * * * *